Patented Oct. 27, 1953

2,657,173

UNITED STATES PATENT OFFICE 2,657,173

PRODUCTION OF ITACONIC ACID

Virgil F. Pfeifer and George E. N. Nelson, Peoria, and Charles Vojnovich, Washington, Ill., and Lewis B. Lockwood, Glen Rock, N. J., assignors to the United States of America as represented by the Secretary of Agriculture No Drawing. Application July 3, 1952, Serial No. 297,188

7 Claims. (Cl. 195—36)

(Granted under Title 35, U. S. Code (1952), sec. 266)

The invention herein described may be manufactured and used by or for the Government of the United States of America for governmental purposes throughout the world without the payment to us of any royalty thereon.

This invention relates to the production of itaconic acid by fermentation of Aspergillus molds, particularly to the submerged aerobic fermentation by methods which afford greatly increased yields and materially reduced fermentation times.

It relates particularly to an improved modification of the method for producing itaconic acid described and claimed in U. S. Patent No. 2,462,981, together with novel features that eliminate certain disadvantages of that and other prior processes.

Previous methods for producing itaconic acid by mold fermentation, as represented by the patented process, have involved fermentation times of 7 days and longer with weight yields of itaconic acid compared with the anhydrous glucose supplied that were within the range of 30-35 percent. Moreover, these yields require an initial pH of 1.4 to 2.8, entailing added costs and fairly close operating controls.

In previous fermentations wherein Aspergillus type molds have been cultivated on carbohydrate media, such as glucose, to produce itaconic acid, it has been customary to employ nutrient media containing at least 10 percent carbohydrate. These prior media also contain the customary mineral nutrients, together with a source of assimilable nitrogen.

We have found that the concentration of sugar, i. e., glucose or other suitable fermentable carbohydrate as disclosed in the patent previously noted, exerts critical effects on the yield of itaconic acid and on the rate at which the itaconic acid peak is reached during the fermentation. We have discovered, for example, that carbohydrate concentrations within the range of 5 to 7 percent afford yields which are as much as double or triple those obtainable by prior methods. At the same time, we have found that the time of fermentation is considerably reduced when employing carbohydrate concentrations within this range. For example, fermentations conducted by prior methods do not reach peak itaconic acid yield until after the fourth or fifth day. Frequently, those fermentations require up to 15 days or longer. According to our novel method, however, peak yields are often reached within 60 hrs. We obtain peak yields of 85 to 90 percent of theoretical consistently in 3-day fermentations.

According to the patented process previously mentioned, the hydrogen ion concentration of the fermentation medium is maintained within the range of pH 1.4 to 2.8. The pH adjustment is accomplished by the addition of non-toxic mineral acids, such as sulfuric acid, nitric acid, hydrochloric acid, or the ammonium salts of such acids. We have found that, in combination with our critical ranges of carbohydrate concentration and other factors which will be explained in detail below, the initial acidity of the medium does not need to be within this high acid range. According to our discoveries, the initial pH may be as high as 5.0. Lower initial pH values for the medium are within the purview of our invention however, since we have found that our improved results may be realized with media having an initial pH as low as 2.5 or thereabout. This feature of our process possesses the advantage over the patented process that less quantities of acid are required and consequently less extraneous material introduced into the fermentation liquor. Our process possesses the additional advantage of eliminating the necessity of adjusting the pH after the initial adjustment, resulting in a simplified fermentation. It is, moreover, an additional feature of our invention to adjust the initial pH to 5.0 or below by adding itaconic acid instead of the mineral acids previously used. It is to be understood, however, that the use of mineral acids to adjust the pH within the desired initial range is operative in our process and may be desirable under certain economic circumstances.

In accordance with our invention, we employ an itaconic acid-producing mold of the genus Aspergillus, such as *Aspergillus terreus* or *Aspergillus itaconicus*. The fermentation is started at an initial pH of 5.0 or less; adjustment, when necessary, being made by the addition of an acidic agent. The addition is preferably made prior to the time of inoculation in the preferred method of operation, i. e., where we inoculate with a seed culture of germinated spores. However, we may carry out our invention by inoculating with ungerminated spores, under circumstances where this procedure may be desirable. As previously stated, we may employ any non-toxic acid or acid-reacting salt, such as the ammonium salts, as disclosed in the Lockwood et al. patent. We may employ itaconic acid, sulfuric acid, phosphoric acid, ammonium sulfate, phosphate or the like.

In the medium, we provide a fermentable carbohydrate material as the source as assimilable carbon such as glucose, sucrose, maltose, dextrins, cane or beet molasses, hydrol, hydrolyzed starches, dextrose syrups and the like. Of these, we prefer glucose for reasons of expedience and economics. This assimilable carbon source should be no more than 7.0 percent based on the weight of the medium. As previously stated, we prefer a level of 5 to 7 percent, the lower amount being dictated by economic prudence.

We may employ a wide variety of substances as source of assimilable nitrogen, as for example, any of the commonly employed nitrogen supplying substances, such as corn steeping liquor, soybean meal, peanut meal, distiller's residues, yeast extracts, urea, ammonia, ammonium salts, such as ammonium phosphate or ammonium sulfate and the like. We provide these, singly or in admixture, in an amount which may be 1 to 3 percent or higher. However, for the sake of economy, we prefer to employ near minimal amounts of substantially less than 1 percent. Employing these small amounts has the additional advantage of minimizing the introduction of extraneous material into the culture liquor. Of the source of assimilable nitrogen mentioned, we have obtained excellent results with corn steeping liquor added in the range of 0.10 to 0.30 percent of the commercially available material which contains about 40 to 50 percent solids. We prefer to use ammonium sulfate in combination with the corn steeping liquor.

The fermentation is carried out at temperatures substantially below 100° F., preferably within the range of 90° to 96° F. Lower temperatures may be employed, however, although at temperatures substantially below 90° F. the rate of fermentation is somewhat slowed. We may carry out the fermentation at atmospheric or increased pressures of, say, about 15 pounds p. s. i. gauge, the latter being preferred since increased amounts of oxygen may thus be dissolved in the medium for the benefit of the conversion of the carbohydrate to itaconic acid.

We have also found, contrary to the results of prior workers, that the amount of inoculum employed affects the rate of fermentation. Even though prior workers have reported a preference for 1 percent by volume of a 48-hr. inoculum and have further reported that increasing the amount of inoculum did not increase the ultimate yield or the rate of fermentation, we have found that larger amounts under the circumstances of our invention do increase the rate of fermentation.

We have obtained good results using at least 5 percent by volume of inoculum, preferably, 10 percent of a 48-hr. inoculum. The upper limit of the volume of inoculum in our process is dictated only by expedience, since we have found no tendency toward deleterious effects as the amount of inoculum is increased even above 10 percent. The term "48-hr. inoculum" in this specification and claims refers to an inoculum of organisms that have been permitted to grow and multiply for at least 48 hours in the customary inoculation medium, i. e., containing sources of assimilable carbon and nitrogen, together with the usual mineral nutrients and growth factors such as is used in the industry for preparation of Aspergillus seed cultures.

In our process we have found, also contrary to the results of prior workers, that the rate of aeration likewise may be increased up to as much as 10 times that previously recommended. We may use, for example, approximately $\frac{1}{10}$ volume or more of air per volume of medium per minute with moderate agitation of the medium. These increased rates of aeration have a beneficial effect upon the overall yield and upon the rate of fermentation. The other novel features which we have previously described, namely, (a) the use of a critical amount of carbohydrate, (b) the use of initial hydrogen ion concentration up to 5.0, and (c) the use of increased amounts of inoculum; all appear to cooperate to produce increased amounts of the necessary oxidative enzyme factors which lead to the conversion of the carbohydrate molecule to the itaconic acid molecule. Our media are, therefore, capable of utilizing larger amounts of oxygen at increased rates. This permits the introduction of the large amounts of air.

Employing our increased aeration rates with moderate agitation of the medium, foaming difficulties are occasionally encountered. These difficulties may be overcome simply, however, by the use of antifoam agents. Of the common antifoam agents, we prefer to use the long chain aliphatic alcohols and have used an ethanol solution of octadecanol with very satisfactory results.

The weight yields according to our process, range from 61 to 65 percent. This figure refers to the weight ratio of itaconic acid compared with the weight of the anhydrous carbohydrate supplied in the fermentation. These yields correspond to 85-90 percent of the theoretical yield, on the same basis.

In the following tabulated specific examples, the fermentations were carried out in 300-gal. stainless steel fermentors (for the 160-gal. fermentations) and in 600-gal. stainless steel fermentors (for the 200-gal. fermentations). The medium for preparing the culture in the seed tanks (60-gal.) was of the same composition as the production medium. Seed cultures were prepared by inoculating with *Asperigillus terreus* at pH 5 or below, a sterilized medium of the following composition:

Table I

| | Per cent |
|---|---|
| Ammonium sulfate | 0.30 |
| Magnesium sulfate (hydrated) | 0.08 |
| Corn sugar (hydrated) | 6.60 |
| Corn steep liquor (as is[1]) | 0.15 |

Sulfuric acid or itaconic acid to reduce pH to 5.0 or below.

[1] 40–45 percent solids.

The seed cultures were incubated at 93° F. for 2 days with aeration and agitation. The seed cultures were then transferred to the sterilized fermentation medium, of the same composition as above, but with the exceptions noted in the table. The operating conditions were:

Table II

| | |
|---|---|
| Air flow | ¼ volume per volume of medium per minute. |
| Fermentor pressure | 15 p. s. i. gauge. |
| Agitator speed | 100–125 R. P. M. |
| Temperature | 93°–95° F. |

Only the original pH was adjusted as noted in the table. Foaming was controlled, when necessary, by the addition of one percent octadecanol in ethanol, automatically.

A proliferating period of 12 to 26 hrs. occurred immediately after inoculation. This was followed by a decrease in sugar content and an increase in titratable acidity of the medium. Itaconic acid concentrations in all samples were determined by alkali titration and bromine absorption methods. The results are listed in Table III.

Table III

| Ex. No. | Sugar, percent | Inoculum, percent | Fermentation period, hrs. | Rate of [1] formation | Yield | | Original pH before inoculation |
|---|---|---|---|---|---|---|---|
| | | | | | Alkali titration | Bromine | |
| 1 | 6.03 | 1 | 97 | 0.83 | 62.5 | 58.8 | |
| 2 | 6.09 | 1 | 97 | 0.83 | 61.0 | 57.1 | |
| 3 | 6.40 | 1 | 92 | 1.09 | 59.6 | 56.5 | |
| 4 | 6.15 | 10 | 66 | 1.15 | 66.6 | 63.6 | |
| 5 | 6.03 | 1 | 76 | 1.10 | 60.4 | 57.9 | 4.8 |
| 6 | 6.03 | 10 | 66 | 1.46 | 65.6 | 62.4 | 5.0 |
| 7 | 6.15 | 10 | 74 | 1.15 | 66.9 | 64.0 | 4.9 |
| 8 | 6.00 | 10 | 66 | 1.57 | 66.0 | 61.1 | 4.2 |
| 9 | 5.64 | 10 | 87 | 1.35 | 60.2 | 60.1 | 2.8 |

[1] Ml. N/10 NaOH per hour for a 10 ml. sample.

In Examples 1 to 4 the fermentations were started at pH 4.0–5.0, adjusted by the addition of sulfuric acid. The amount of acid required was less than 1/5 that required to reduce the pH to 2.2. In the remaining examples the initial pH was adjusted by the addition of itaconic acid.

Itaconic acid was recovered from batches of fermented liquor by filtering, concentrating to 7½ percent of the original volume at 15 inches vacuum, centrifuging, washing, and combining the mother liquor and washings with the next batch. In this manner, it was possible to obtain five crops of crystals before the purity and color of the recovered acid necessitated discarding the mother liquor. A 94 percent yield of 96.5 percent itaconic acid was obtained, representing a total recovery of 91 percent of the acid produced by fermentation.

Itaconic acid was also recovered from batches of fermented liquor by filtering, concentrating to 7½ percent of the original volume at 15 inches vacuum, crystallizing, centrifuging, washing, concentrating the combined mother liquor and washings to 2½ percent of the original volume under vacuum, and recovering a second crop of crystals. The second crop crystals were recycled with the next batch of fermented liquor. A 93-percent yield of 98 percent itaconic acid was obtained, representing a total recovery of 91 percent of the acid produced by fermentation.

White itaconic acid of over 99 percent purity was recovered by carbon treatment of the solution of tan crystals, followed by recrystallization.

We claim:
1. A method for producing itaconic acid which comprises inoculating a nutrient medium containing substantial amounts of, but no more than about 7 percent fermentable carbohydrate and a source of assimilable nitrogen with an itaconic acid-producing mold of the genus Aspergillus under submerged aerobic conditions, said medium being at a pH within the range of 1.4 to 5.0, and continuing the fermentation whereby appreciable amounts of itaconic acid are formed, and recovering the thereby produced itaconic acid.

2. The method of claim 1 in which the inoculant is at least 5 percent by volume of the medium of a 48-hr. inoculum of an itaconic acid-producing mold of the genus Aspergillus.

3. The method of claim 1 in which the initial pH of the medium is adjusted by the addition of itaconic acid.

4. The method of claim 1 in which the fermentation is carried out at a gauge pressure of about 15 pounds per square inch.

5. In a method of producing itaconic acid which comprises inoculating a nutrient medium containing substantial amounts of, but not more than about 7 percent fermentable carbohydrate and a source of assimilable nitrogen with an itaconic acid-producing mold of the genus Aspergillus under submerged aerobic conditions, the step which comprises adjusting the pH of the medium prior to the main course of fermentation, to a value within the range of 1.4 to 5.0.

6. A method of producing itaconic acid which comprises inoculating a nutrient medium containing 5 to 7 percent fermentable carbohydrate and a source of assimilable nitrogen with at least 5 percent by volume of the medium of a 48-hr. inoculum of *Aspergillus terreus*, itaconic acid having been added to said medium to bring the pH within the range of 2.5 to 5.0, conducting the fermentation under submerged aerobic conditions at a temperature within the range of 90° to 96° F.

7. The method of claim 6 in which the aerobic conditions are maintained by the introduction of air under about 15 pounds per square inch gauge pressure at the rate of at least 1/10 volume of air per volume of medium per minute, accompanied by agitation of the medium.

VIRGIL F. PFEIFER.
GEORGE E. N. NELSON.
CHARLES VOJNOVICH.
LEWIS B. LOCKWOOD.

References Cited in the file of this patent

UNITED STATES PATENTS

| Number | Name | Date |
|---|---|---|
| 2,385,283 | Kane et al. | Sept. 18, 1945 |
| 2,462,981 | Lockwood et al. | Mar. 1, 1949 |